(12) United States Patent
Patel

(10) Patent No.: US 8,117,308 B1
(45) Date of Patent: *Feb. 14, 2012

(54) DETECTING EVENTS OF INTEREST

(75) Inventor: Amit J. Patel, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,042

(22) Filed: Jun. 27, 2011

Related U.S. Application Data

(63) Continuation of application No. 11/497,798, filed on Jul. 31, 2006, now Pat. No. 7,970,934.

(51) Int. Cl.
*G06F 15/173* (2006.01)
(52) U.S. Cl. .................. 709/224; 714/5; 725/46; 707/5
(58) Field of Classification Search .................. 709/223, 709/224; 714/5; 725/46; 707/5
See application file for complete search history.

(56) References Cited

U.S. PATENT DOCUMENTS

| | | |
|---|---|---|
| 6,671,681 B1 | 12/2003 | Emens et al. |
| 7,337,458 B2 * | 2/2008 | Michelitsch et al. ............ 725/46 |
| 2003/0110124 A1 * | 6/2003 | Escher ............................. 705/38 |
| 2004/0010372 A1 | 1/2004 | Schwoegler |
| 2004/0260621 A1 | 12/2004 | Foster et al. |
| 2005/0234880 A1 | 10/2005 | Zeng et al. |
| 2005/0234953 A1 | 10/2005 | Zhang et al. |
| 2005/0278565 A1 | 12/2005 | Frattura et al. |
| 2005/0278585 A1 * | 12/2005 | Spencer .......................... 714/46 |
| 2007/0094247 A1 | 4/2007 | Chowdhury et al. |
| 2008/0133503 A1 | 6/2008 | Popescul et al. |
| 2008/0195602 A1 * | 8/2008 | Keller et al. ...................... 707/5 |
| 2009/0319518 A1 | 12/2009 | Koudas et al. |

OTHER PUBLICATIONS

Chang et al., "BigTable: A Distributed Storage System for Structured Data," 7th USENIX Symposium on Operating Systems Design and Implementation (Nov. 2006), pp. 205-218.
Dean et al, "MapReduce: Simplified Data Processing on Large Clusters," *OSDI'04: Sixth Symposium on Operating System Design and Implementation*, San Francisco, CA, (Dec. 2004).
"frequently asked questions". Yahoo! Buzz Index [online]. [retrieved on Apr. 14, 2010]. Retrieved from the Internet: <URL: http://web.archive.org/web/20060718025757/buzz/yahoo.com/faq/>, 2 pages.
Ghemwat et al, "The Google File System," *19th ACM Symposium on Operating Systems Principles*, (Oct. 2003).
Google Trends. Google [online]. [retrieved on Apr. 14, 2010]. Retrieved from the Internet: <URL: http://web.archive.org/web/20060601194655/http://www.google.com/trends>, 1 page.
"Google Trends: Peer Into Google's Database of Searches". Search Engine Watch [online]. [retrieved on Apr. 14, 2010]. Retrieved from the Internet: <URL: http://blog.searchenginewatch.com/060510-152638>, 2 pages.

(Continued)

*Primary Examiner* — Tammy Nguyen
(74) *Attorney, Agent, or Firm* — Fish & Richardson P.C.

(57) ABSTRACT

Methods, systems, and apparatus, including computer program products, for detecting events of interest. In one aspect, a method includes generating a network traffic model that includes forecasted time series data representative of a frequency of actions related to a network traffic entity, and identifying that an event of interest has occurred based on a comparison of actual time series data related to the network traffic entity with the forecasted time series data.

41 Claims, 4 Drawing Sheets

OTHER PUBLICATIONS

Lycos Featured Content and Featured Services. Lycos [online]. [retrieved on Apr. 14, 2010]. Retrieved from the Internet: <URL: http://web.archive.org/web/20060701030700/http://www.lycos.com/>, 1 page.

Pike et al, "Interpreting the Data: Parallel Analysis with Sawzall," *Scientific Programming Journal*, Special Issue on Grids and Worldwide Computing Programming Models and Infrastructure (2003) 13:4, pp. 227-229.

StatSoft, Inc., "Time Series Analysis" [online] [retrieved on Jul. 11, 2007]. Retrieved from the Internet: <URL: http://www.statsoft.com/textbook/sttimser.html>.

Sullivan, D., "What People Search for—Most Popular Keywords". Search Engine Watch, May 26, 2006. Search Engine Watch [online]. [retrieved on Apr. 14, 2010]. Retrieved from the Internet: <URL: http://searchenginewatch.com/2156041>, 2 pages.

"Top Searches for Week ending Jun. 30, 2006". Ask [online]. [retrieved on Apr. 14, 2010]. Retrieved from the Internet: <URL: http://web.archive.org/web/20060707093436/http://about.ask.com/en/docs/iq/iq.shtml>, 2 pages.

"year in review 2006". AOL Search—2006 Year End Hot Searches [online]. [retrieved on Apr. 14, 2010]. Retrieved from the Internet: <URL: http://about-search.aol.com/hotsearches2006/index.html>, 1 page.

* cited by examiner

DETECTING EVENTS OF INTEREST

CROSS-REFERENCE TO RELATED APPLICATIONS

This application is a continuation application and claims priority under 35 U.S.C. Section 120 of U.S. application Ser. No. 11/497,798, filed on Jul. 31, 2006. The disclosure of the prior application is considered part of and is incorporated by reference in the disclosure of this application.

BACKGROUND

This specification relates to detecting events of interest in a context of network traffic.

A web browser is a software application that enables a user to display and interact with text, images, and other information located on a web page or other resource, typically one stored in a web server accessed over the Internet or a local area network. Popular web browsers available for personal computers include Microsoft® Internet Explorer, Mozilla® Firefox®, Opera, Netscape Navigator®, and Apple Safari™. A conventional web browser may use a Hypertext Transfer Protocol (HTTP) to exchange information with a server. A web browser may access resources stored in a web server, which can store or create resources such as Hypertext Markup Language (HTML) files and JPEG images. A web server may operate by accepting HTTP requests over a network, and providing an HTTP response to the requester (e.g., the web browser). The HTTP response typically consists of an HTML document, but can also be a raw text file, an image, or other type of document.

SUMMARY

In general, one aspect of the subject matter described in this specification can be embodied in a computer-implemented method that includes generating a network traffic model comprising forecasted time series data representative of a frequency of actions related to a network traffic entity, and identifying that an event of interest has occurred based on a comparison of actual time series data related to the network traffic entity with the forecasted time series data. Other embodiments of this aspect include corresponding systems, apparatus, and computer program products.

These and other embodiments can optionally include one or more of the following features. The forecasted time series data includes a set of forecasted values, each forecasted value being representative of a forecasted frequency of actions related to the network traffic entity during a time interval of a forecasted time segment that spans a plurality of time intervals. Generating the network traffic model includes estimating a confidence interval for the network traffic model, the confidence interval being defined by an upper confidence limit and a lower confidence limit. Generating the network traffic model includes identifying a pattern by comparing sets of historic time series data, each set of historic time series data being associated with a distinct historic time segment spanning a plurality of time intervals, and determining the forecasted time series data s based on the identified pattern. Generating the network traffic model includes expressing historic time series data as a best fit curve. Determining a noise baseline level for the network traffic model by comparing the historic time series data over a time segment with forecasted time series data over the same time segment. The actual time series data includes a set of actual values, each actual value being representative of an actual frequency of actions related to the network traffic entity during a time interval of an actual time segment. Identifying that an event of interest has occurred includes for each time interval within the actual time segment, comparing the actual value with the forecasted value corresponding to the time interval to determine whether the actual value exceeds a confidence interval of the forecasted value, and if so, designating the actual value as representative of an occurrence of an event of interest. Assigning a score to the event of interest. Assigning a score to the event of interest includes assigning a score based on a temporal displacement of the time interval associated with the actual value that exceeds the confidence interval of the forecasted value with a current time. Assigning a score to the event of interest includes assigning a score based on an amount by which the actual value exceeds the confidence interval of the forecasted value. Assigning a score to the event of interest includes assigning a score based on the amount of the actual value. Obtaining historic time series data representative of a frequency of actions related to the network traffic entity during a historic time segment that spans a plurality of time intervals. Obtaining the historic time series data includes collecting historic values, each historic value being representative of an actual frequency of actions during a time interval of the historic time segment. Prior to identifying that an event of interest has occurred, analyzing the actual time series data to remove outliers indicative of spam. Generating a report including information representative of the event of interest. The information includes one or more of geographic information, a timestamp, a cookie hash, and a network traffic entity identifier. The network traffic entity includes one of a query term, an electronic media file, and a uniform resource locator. Generating the report includes excluding from the report information representative of an event if spam contributed to identifying an event of interest.

Particular embodiments of the subject matter described in this specification can be implemented to realize one or more of the following advantages. Building a network traffic model to predict behavior for each entity (e.g., search query) allows events of interest to be detected from a theoretically infinite number of entities. By treating each entity independently, analysis of multiple network traffic models can occur in parallel. The time series data obtained is robust and corresponds to any granularity of time segments spanning a plurality of time intervals. Consequently, noise and problems can be accounted for when building a network traffic model. The network traffic models can be built for different time scales, avoiding the need to obtain a critical mass of data before it can be analyzed. Detailed information about an entity (e.g., geographic information) can enhance a report of events of interest. By considering the noisiness of the time series data, low-volume data, that would otherwise be ignored, can be associated with events of interest. Network traffic models can be produced independently of their analyses. Analysis can then be performed multiple times during a given time segment (e.g., throughout a day), instead of once per time segment (e.g., one at the end of a day). Network traffic models over a time segment spanning a plurality of time intervals can detect seemingly less significant events of interest that otherwise appear as noise.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
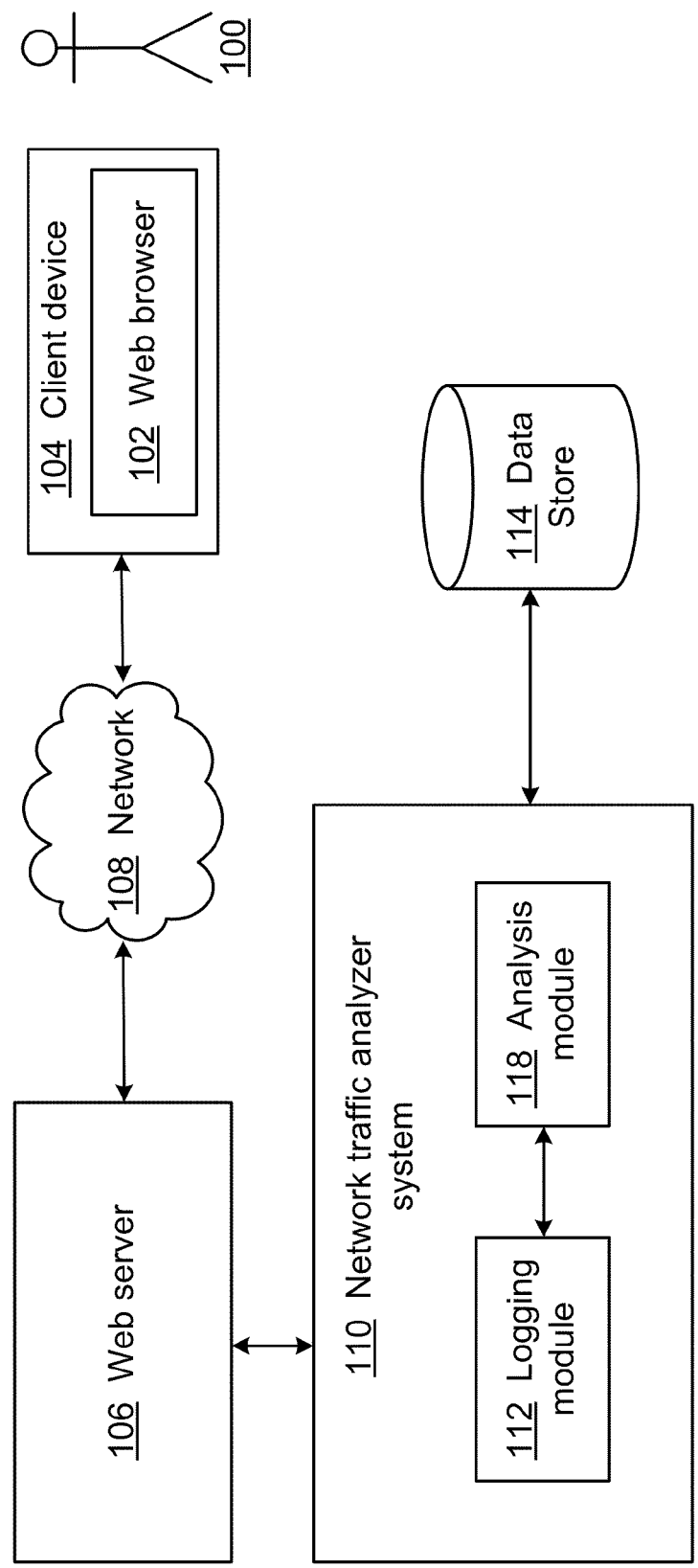
FIG. 1 shows a network including a network traffic analyzer system.
Figure 2:
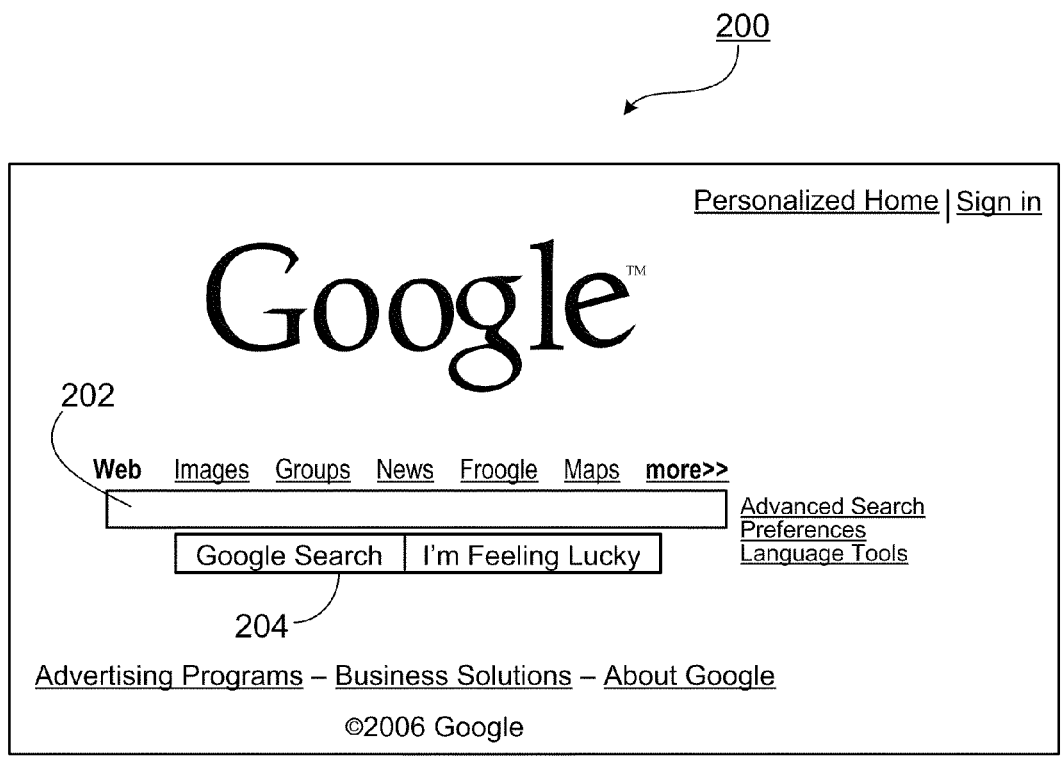
FIG. 2 shows a screenshot of a search engine user interface.

As shown in FIGS. 1 and 2, a user 100 interacts with a search engine through a user interface 200 that is presented by a web browser 102 on a client device 104. The client device 104 can be one of any kind of mobile and tethered computing devices, for example, personal computers, workstations, mobile computers, laptop computers, electronic games, media players (e.g., an iPod® mobile digital device), and mobile phones.

The exemplary search engine user interface 200 of FIG. 2 contains user interface elements, such as a text box 202 in which a search query can be specified, and a button 204 which can be selected to submit the search query. When a user 100 submits a search query (such as http://www.google.com/search?q=britney+spears, a search query for 'Britney Spears'), the user's web browser 102 first performs a domain name system (DNS) lookup to map www.google.com to a particular Internet Protocol (IP) address. The web browser 102 then sends a Hypertext Transport Protocol (HTTP) request to the computing device corresponding to the IP address, in this case, a web server 106 through a network 108. The network 108 may be an IP-enabled network, and may include a local area network (LAN), and/or a wide area network (WAN), which may, or may not, include the Internet. The network 108 may be wired, wireless, or a combination of the two.

After receiving the search query, the web server 106 coordinates the query execution and formats the results into a Hypertext Markup Language (HTML) response to the user's web browser 102. The results are generally presented in a web browser 102 window as an ordered list of document titles. Each document title is a selectable link that is associated with a specific uniform resource locator (URL).

In addition to the query execution, the web server 106 also initiates a number of tasks upon receiving the search query, such as sending the search query to a network traffic analyzer system 110.

In the illustrated example of FIG. 1, the network traffic analyzer system 110 includes a module ("logging module" 112) that implements a process for logging the network traffic at the web server 106. In some implementations, this process logs information (e.g., geographic location by city and/or country of the client device 104, IP address of the client device 104, and hash of a cookie) related to each user 100 that interacts with the search engine, what interactions each user 100 has with the search engine (e.g., which search result document title a user 100 clicks on, and the number of instances in which the user 100 clicks on that document title), a timestamp for each interaction, and a network traffic entity identifier (e.g., a normalized query string) for each interaction. This process results in raw data that is representative of the logging of events that occur on the search results pages. The raw data may be stored in a data store 114 accessible by the network traffic analyzer system 110 in a manner that enables network traffic to be extracted for any given time segment.

Figure 3:
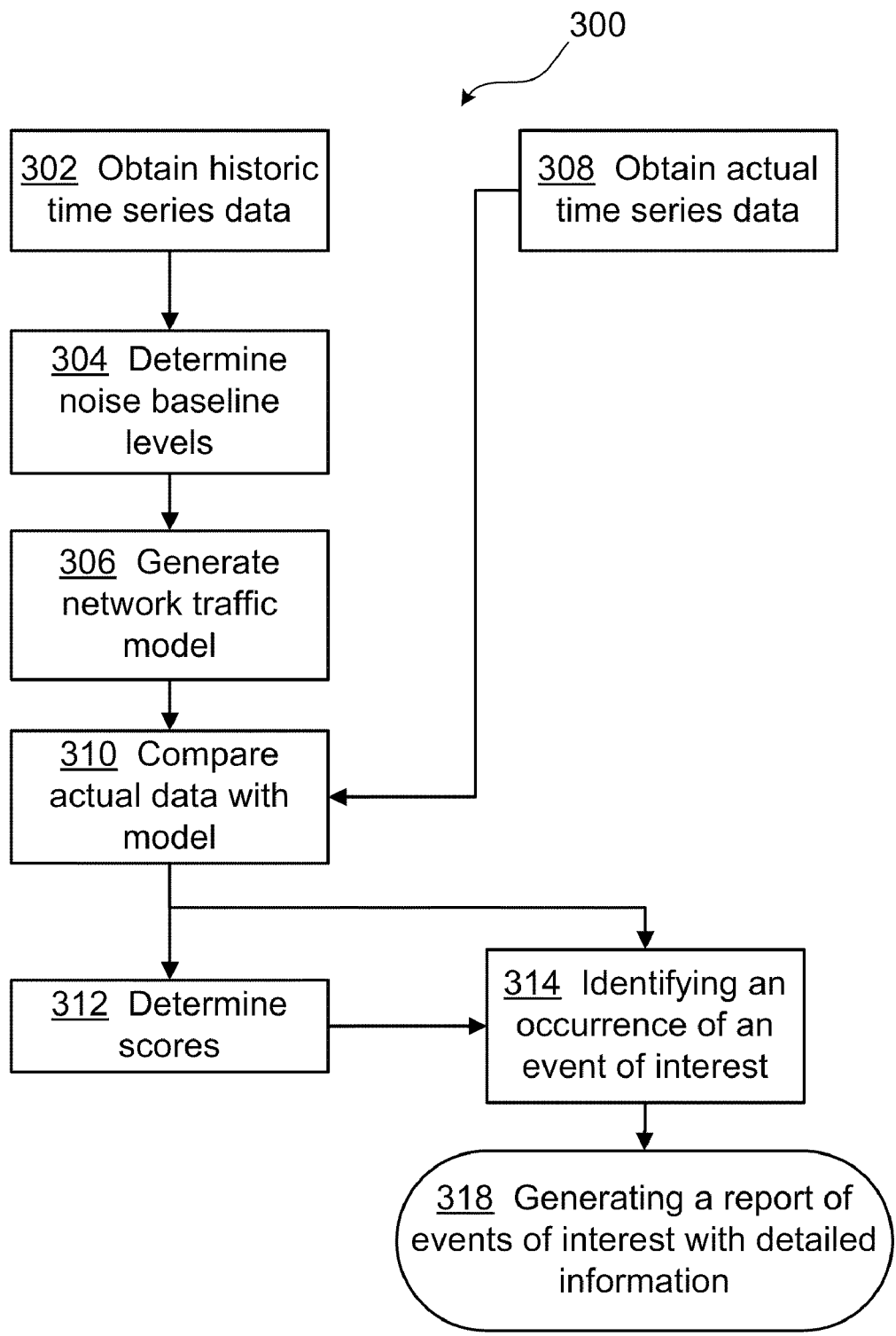
FIG. 3 shows a flowchart for a process for detecting an event of interest.

As shown in FIGS. 1 and 3, the network traffic analyzer system 110 also includes a module ("analysis module" 118 of FIG. 1) that implements a process 300 for detecting an event of interest based on an analysis of the network traffic at a search engine where the traffic is related to a particular entity. An event may be of interest if it does not conform to (e.g., exceeds) expectations. Although the following examples describe the process 300 in the context of a network traffic entity that is a search query for 'Britney Spears' (the "Britney Spears' search query"), the process 300 is also applicable to other types of network traffic entities, such as URLs and multimedia files (e.g., image, audio or video files). That is, the process 300 may be implemented to detect that an event of interest has occurred based on an analysis of network traffic that is related to a specific URL (e.g., number of instances in which users click on a document title presented in users' respective web browsers) or a specific multimedia file (e.g., number of instances in which users select to view, listen to, or otherwise interact with a multimedia file presented in users' respective web browsers 102). Other examples of network traffic entities include electronic mail content and online chat content.

Initially, the analysis module 118 obtains (302) historic time series data related to the network traffic entity, in this case, the 'Britney Spears' search query. The historic time series data includes a set of historic values. Each historic value is representative of a frequency of actions related to the network traffic entity during a particular time interval of a historic time segment. In some implementations, at the end of each twenty-four hour time period, the analysis module 118 extracts raw data related to the 'Britney Spears' search query from the data store 114, and determines a count of all occurrences of the 'Britney Spears' search query during each time interval (e.g., on an hourly basis) of the time segment (i.e., the twenty-four hour time period). This count (referred to in this description as the "hourly query count") is then merged with the hourly query counts of the previous four weeks to generate historic time series data related to the 'Britney Spears' search query for a historic time segment of four weeks.

It is assumed that the raw data includes noise that can make patterns (if any exist) difficult to identify. The noise can be random error, or in some cases, spam (artificially inflated network traffic, e.g., from an automated system making a large number of requests for entities). As an example, search queries for 'gmail' or any other electronic mail service are generally expected to have little "noise" from hour to hour or week to week, as public interest in electronic mail services seldom exhibits sudden increases in interest. On the other hand, search queries for 'Britney Spears' may fluctuate widely as news of the pop idol's personal life or career makes television or the tabloids. As another example, a query count for a 'New England Patriots' search query may be expected to be higher on Sundays and Mondays during football season. Likewise, a query count for a 'New York Times' search query may be expected to be higher in the client-local morning hours as compared to the afternoon or evening hours.

In some implementations, the analysis module 118 determines (304) baseline levels for noise and filters out noise (including spam) from the raw data to obtain the historic time series data. This process of filtering out the noise (including spam) may involve applying a set of local rules (e.g., removal of raw data associated with log entries that do not include cookies) and/or a set of global rules (e.g., count a search query once in those instances where multiple search queries are associated with a single cookie).

Having filtered out the noise (and spam), the analysis module 118 uses the historic time series data to generate (306) a network traffic model for the 'Britney Spears' search query. This network traffic model can be derived using a traditional time series analysis, which generally: (a) identifies the nature (e.g., a pattern) of a phenomenon represented by the sequence of observations, and (b) forecasts or predicts future behavior. In this regard, time series data can be described in terms of two basic classes of components: trend and seasonality. Trends represent a general systematic linear or nonlinear component that changes over time and does not repeat or at least does not repeat within the time range captured by the data (e.g., a plateau followed by a period of exponential growth). Seasonalities may have a similar nature (e.g., a plateau followed by a period of exponential growth), however, it repeats itself in systematic intervals over an extended period of time. Trend and seasonality may coexist in real-life data. For example, search queries for 'gmail' may rapidly grow over time segments of years but still follow consistent seasonal patterns (e.g., as much as 25% of network traffic each year is in December, whereas only 4% is in August).

The analysis module 118 generates (306) the network traffic model by identifying patterns (e.g., trend and seasonality) in the historic time series data and predicting future behavior. The predicted future behavior, i.e., forecasted values based on the identified pattern, is associated with a forecasted time segment. In some implementations, the time intervals of the forecasted time segment correspond to the time intervals of the historic time segments. That is, the values of the time intervals of the forecasting time segment are forecasted (i.e., predicted) from values of corresponding time intervals of the historic time segment.

In some implementations, as part of the network traffic model generation, the analysis module 118 estimates a confidence interval for each time interval of the forecasted time segment based on the values of the corresponding time intervals of the historic time segment. The confidence interval is defined by an upper confidence limit and a lower confidence limit, and represents an expected range of fluctuation in value. Yet other implementations express the historic time series data with a best fit curve. The best fit curve can be a linear function; however, if there is a nonlinear component to the historic time series data, the data can be expressed with, for example, a logarithmic, exponential, or polynomial function.

The analysis module 118 obtains (308) actual time series data, which includes a set of actual network traffic values associated with time intervals spanning an actual time segment to be analyzed against the network traffic model. Generally, the time intervals of the time segment desired to be analyzed correspond to the time intervals of the network traffic model. For each time interval, the analysis module 118 compares (310) the actual value with the forecasted value. In one example, at the end of each sixty minute time period, the analysis module 118 extracts raw data related to the 'Britney Spears' search query from the data store 114, and determines a count of all occurrences of the 'Britney Spears' search query during that time interval. This count (i.e., the actual value) is then compared with the predicted count (i.e., the forecasted value) for the 'Britney Spears' search query for that same time interval. When an actual value exceeds expectations as given by the confidence interval (i.e., the actual value exceeds the upper confidence limit) estimated of the corresponding forecasted value, this serves as an indicator that an event of interest (e.g., an earthquake, news about a particular celebrity) may have occurred during that time interval.

Figure 4:
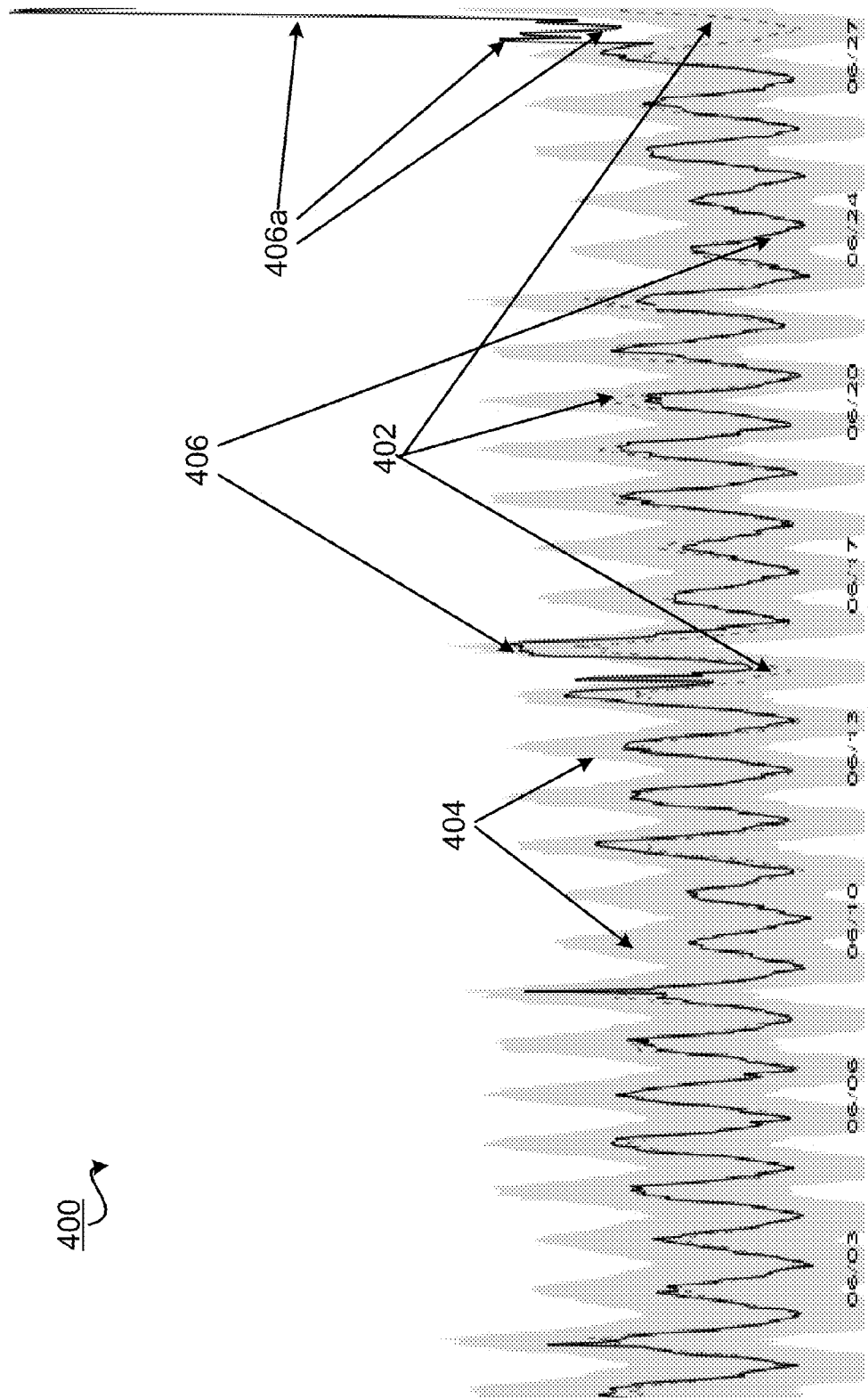
FIG. 4 shows a graph representing a comparison of actual time series data against a network traffic model.

In FIG. 4, an illustrative graph 400 represents a comparison of actual time series data against a network traffic model. The graph 400 depicts approximately four weeks of actual and forecasted values for the 'Britney Spears' search query spanning Jun. 1, 2006 through Jun. 28, 2006. The forecasted values representative of the network traffic model are denoted by a dashed line 402, and the confidence intervals are shown in the shaded portions 404. The actual values obtained over the four weeks are denoted by the solid line 406. On or about Jun. 27, 2006, the actual values at various time intervals exceeded the confidence interval 404 by varying amounts as denoted by portions 406a of the solid line 406. A subsequent analysis of the events of Jun. 27, 2006 would reveal that the pop idol's announcement that she is expecting her second child contributed to a large spike in 'Britney Spears' search queries by users interested in learning more about the announcement.

In some implementations, the analysis module 118 determines (312) scores for the actual values representative of an occurrence of an event of interest. In cases where the analysis module 118 handles multiple series of data of the 'Britney Spears' search query, or multiple series of data representing 'Britney Spears' and 'earthquake' search queries, there may be multiple occurrences of events of interest. Scoring can then be useful to identify (314) the occurrences of events of interest that meet a threshold score. The scores can also be used to quantitatively rank the occurrences of events of interest. In such cases, the occurrences of events of interest are sorted, and for example, the top 1,000 occurrences can be identified (314).

The analysis module 118 assigns (312) scores based on scoring factors. For example, a scoring factor considers the temporal displacement of the time interval associated with the actual value that exceeds the confidence interval of the forecasted value with a current time. That is, scores are assigned corresponding to the recency of an occurrence of an event of interest. Therefore, an occurrence of an event of interest one hour prior to a current time can be assigned a quantitatively more significant score (e.g., a higher score) than an occurrence of an event of interest one week prior to the current time. The current time can be any arbitrarily fixed time, but generally represents the time at which the process 300 compares (310) actual data against the network traffic model. Other implementations include assigning (312) scores based on an amount of the actual value, i.e., volume. The process 300 can also assign (312) a score based on an amount by which the actual value exceeds the confidence interval of the forecasted value. As discussed above, scoring can be useful to identify (314) the occurrences of events of interest that meet a threshold score. The scores can also be used to quantitatively rank the occurrences of events of interest.

After identifying (314) occurrences of events of interest (whether through assigning (312) scores or not), the analysis module 118 generates (316) a report of occurrences of events of interest. Specifically, the process 300 can use the scoring factors together or independently to generate (316) reports for an intended use. That is, the relative weights of the scoring factors vary by the intended use of the report. For example, if the process 300 generates (316) a report to list all the major events of interest over the past week, the temporal displacement, i.e., the recency factor, would weigh more favorably the data within the past week. In addition, the scores based on the amount of the actual value, and scores in comparison to the confidence interval of the forecasted value, would both weigh more favorably the data featuring high, or relatively higher, volume. However, the process 300 can also generate (316) a report to show current, but relatively unknown and obscure, events of interest. The scoring factors would generally favor the data from the past few hours and with smaller volume. As a result, the weighting of the scoring factors allows for traffic related to a particular entity to result as an event of interest on both reports, but with different scores.

The report may or may not include additional information representative of the occurrences of the events of interest. This information may be obtained, e.g., from the logging module 112, along with the actual time series data and includes geographic information, timestamps, hashes of cookies, and network traffic entity identifiers. The additional information enriches a report of the occurrences of events of interest, without revealing any personally identifiable information.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the network.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method, comprising:
    logging network traffic at a search engine to generate a log of user interactions with the search engine;
    generating a network traffic model for a network traffic entity, the model based on actions in the log that relate to the network traffic entity, the model comprising forecasted time series data representative of a frequency of actions related to the network traffic entity predicted for each of a plurality of time intervals within a forecasted time segment; and
    identifying that an event of interest has occurred based on a comparison of (i) actual time series data derived from user interactions related to the network traffic entity, the user interactions occurring in the forecasted time segment, with (ii) the forecasted time series data, and wherein identifying that an event of interest has occurred further comprises:
        for each time interval within the forecasted time segment, comparing the actual value with the forecasted value corresponding to the time interval to determine whether the actual value exceeds a confidence interval of the forecasted value, and if so, designating the actual value as a representative of an occurrence of an event of interest.

2. The method of claim 1, wherein:
    the actual time series data comprises a set of actual values, each actual value being representative of an actual frequency of actions related to the network traffic entity during a time interval of the forecasted time segment.

3. The method of claim 1, further comprising:
    assigning a score to the event of interest; and
    ranking the event of interest against other events of interest based on the score.

4. The method of claim 1, further comprising:
    assigning a score to the event of interest based on a temporal displacement of the time interval associated with the actual value that exceeds the confidence interval of the forecasted value with a current time.

5. The method of claim 1, further comprising:
    assigning a score to the event of interest based on an amount by which the actual value exceeds the confidence interval of the forecasted value.

6. The method of claim 1, further comprising:
    assigning a score to the event of interest based on a magnitude of the actual value.

7. The method of claim 1, further comprising:
    generating a report including information representative of the event of interest.

8. The method of claim 7, wherein the information comprises one or more of geographic information, a timestamp, a cookie hash, and a network traffic entity identifier.

9. The method of claim 1, wherein the network traffic entity comprises one of a query term, an electronic media file, or a uniform resource locator.

10. A computer-readable memory device storing instructions which when executed by a data processing apparatus cause the data processing apparatus to perform operations comprising:
    logging network traffic at a search engine to generate a log of user interactions with the search engine;
    generating a network traffic model for a network traffic entity, the model based on actions in the log that relate to the network traffic entity, the model comprising forecasted time series data representative of a frequency of actions related to the network traffic entity predicted for each of a plurality of time intervals within a forecasted time segment; and
    identifying that an event of interest has occurred based on a comparison of (i) actual time series data derived from user interactions related to the network traffic entity, the user interactions occurring in the forecasted time segment with (ii) the forecasted time series data, and wherein generating the network traffic model comprises:
        identifying a pattern by comparing sets of historic time series data, each set of historic time series data being associated with a distinct one of a plurality of historic time segments, each historic time segment having respective time intervals corresponding to the time intervals of the forecasted time segment; and
        determining the forecasted time series data for the forecasted time segment base on the identified pattern.

11. The computer-readable memory device of claim 10, wherein generating the network traffic model comprises:
    estimating a confidence interval for each of the plurality of time intervals within the forecasted time segment for the network traffic model, the confidence interval being defined by an upper confidence limit and a lower confidence limit.

12. The computer-readable memory device of claim 10, wherein generating the network traffic model comprises:
    expressing historic time series data as a best fit curve.

13. The computer-readable memory device of claim 10, wherein the operations further comprise:
    determining a noise baseline level for the network traffic model based on a difference between historic time series data over a historic time segment with previously forecasted time series data over the same historic time segment.

14. The computer-readable memory device of claim 10, wherein:
    the actual time series data comprises a set of actual values, each actual value being representative of an actual frequency of actions related to the network traffic entity during a time interval of the forecasted time segment.

15. The computer-readable memory device of claim 14, wherein identifying that an event of interest has occurred comprises:
    for each time interval within the forecasted time segment, comparing the actual value with the forecasted value corresponding to the time interval to determine whether the actual value exceeds a confidence interval of the forecasted value, and if so, designating the actual value as representative of an occurrence of an event of interest.

16. The computer-readable memory device of claim 10, wherein the operations further comprise:
assigning a score to the event of interest; and
ranking the event of interest against other events of interest based on the score.

17. The computer-readable memory device of claim 15, wherein the operations further comprise:
assigning a score to the event of interest based on a temporal displacement of the time interval associated with the actual value that exceeds the confidence interval of the forecasted value with a current time.

18. The computer-readable memory device of claim 15, wherein the operations further comprise:
assigning a score to the event of interest based on an amount by which the actual value exceeds the confidence interval of the forecasted value.

19. The computer-readable memory device of claim 15, wherein the operations further comprise:
assigning a score to the event of interest based on a magnitude of the actual value.

20. The computer-readable memory device of claim 10, wherein the operations further comprise:
obtaining historic time series data representative of a frequency of actions related to the network traffic entity during a historic time segment that spans a plurality of time intervals.

21. The computer-readable memory device of claim 20, wherein obtaining the historic time series data comprises:
collecting historic values, each historic value being representative of an actual frequency of actions during a time interval of the historic time segment.

22. The computer-readable memory device of claim 10, wherein the operations further comprise:
prior to identifying that an event of interest has occurred, analyzing the actual time series data to remove outliers indicative of spam.

23. The computer-readable memory device of claim 10, wherein the operations further comprise:
generating a report including information representative of the event of interest.

24. The computer-readable memory device of claim 23, wherein the information comprises one or more of geographic information, a timestamp, a cookie hash, and a network traffic entity identifier.

25. The computer-readable memory device of claim 10, wherein the network traffic entity comprises one of a query term, an electronic media file, or a uniform resource locator.

26. A system comprising:
one or more computers and one or more storage devices storing instructions that when executed by the one or more computers cause the one or more computers to perform operations comprising:
logging network traffic at a search engine to generate a log of user interactions with the search engine;
generating a network traffic model for a network traffic entity, the model based on actions in the log that relate to the network traffic entity, the model comprising forecasted time series data representative of a frequency of actions related to the network traffic entity predicted for each of a plurality of time intervals within a forecasted time segment; and
identifying that an event of interest has occurred based on a comparison of (i) actual time series data derived from user interactions related to the network traffic entity, the user interactions occurring in the forecasted time segment with (ii) the forecasted time series data, and wherein generating the network traffic model comprises:
identifying a pattern by comparing sets of historic time series data, each set of historic time series data being associated with a distinct one of a plurality of historic time segments, each historic time segment having respective time intervals corresponding to the time intervals of the forecasted time segment; and
determining the forecasted time series data for the forecasted time segment base on the identified pattern.

27. The system of claim 26, wherein generating the network traffic model comprises:
estimating a confidence interval for each of the plurality of time intervals within the forecasted time segment for the network traffic model, the confidence interval being defined by an upper confidence limit and a lower confidence limit.

28. The system of claim 26, wherein generating the network traffic model comprises:
expressing historic time series data as a best fit curve.

29. The system of claim 26, wherein the operations further comprise:
determining a noise baseline level for the network traffic model based on a difference between historic time series data over a historic time segment with previously forecasted time series data over the same historic time segment.

30. The system of claim 26, wherein:
the actual time series data comprises a set of actual values, each actual value being representative of an actual frequency of actions related to the network traffic entity during a time interval of the forecasted time segment.

31. The system of claim 30, wherein identifying that an event of interest has occurred comprises:
for each time interval within the forecasted time segment, comparing the actual value with the forecasted value corresponding to the time interval to determine whether the actual value exceeds a confidence interval of the forecasted value, and if so, designating the actual value as representative of an occurrence of an event of interest.

32. The system of claim 26, wherein the operations further comprise:
assigning a score to the event of interest; and
ranking the event of interest against other events of interest based on the score.

33. The system of claim 31, wherein the operations further comprise:
assigning a score to the event of interest based on a temporal displacement of the time interval associated with the actual value that exceeds the confidence interval of the forecasted value with a current time.

34. The system of claim 31, wherein the operations further comprise:
assigning a score to the event of interest based on an amount by which the actual value exceeds the confidence interval of the forecasted value.

35. The system of claim 31, wherein the operations further comprise:
assigning a score to the event of interest based on a magnitude of the actual value.

36. The system of claim 26, wherein the operations further comprise:
obtaining historic time series data representative of a frequency of actions related to the network traffic entity during a historic time segment that spans a plurality of time intervals.

37. The system of claim 36, wherein obtaining the historic time series data comprises:

collecting historic values, each historic value being representative of an actual frequency of actions during a time interval of the historic time segment.

38. The system of claim 26, wherein the operations further comprise:

prior to identifying that an event of interest has occurred, analyzing the actual time series data to remove outliers indicative of spam.

39. The system of claim 26, wherein the operations further comprise:

generating a report including information representative of the event of interest.

40. The system of claim 39, wherein the information comprises one or more of geographic information, a timestamp, a cookie hash, and a network traffic entity identifier.

41. The system of claim 26, wherein the network traffic entity comprises one of a query term, an electronic media file, or a uniform resource locator.

* * * * *

UNITED STATES PATENT AND TRADEMARK OFFICE
CERTIFICATE OF CORRECTION

| | | |
|---|---|---|
| PATENT NO. | : 8,117,308 B1 | Page 1 of 1 |
| APPLICATION NO. | : 13/170042 | |
| DATED | : February 14, 2012 | |
| INVENTOR(S) | : Amit J. Patel | |

It is certified that error appears in the above-identified patent and that said Letters Patent is hereby corrected as shown below:

In Claim 10, column 10, line 37, after "segment" delete "base" and insert -- based --.

In Claim 26, column 12, line 11, after "segment" delete "base" and insert -- based --.

Signed and Sealed this
Tenth Day of April, 2012

David J. Kappos
*Director of the United States Patent and Trademark Office*